United States Patent [19]
Kumagai et al.

[11] Patent Number: 6,101,021
[45] Date of Patent: Aug. 8, 2000

[54] OPTICAL PULSE GENERATOR

[75] Inventors: Yoshihiro Kumagai; Akio Ichikawa; Rikihiro Iida; Masataka Nakazawa; Eiji Yoshida, all of Tokyo, Japan

[73] Assignees: Ando Electric Co., Ltd.; Nippon Telegraph & Telephone Corporation, both of Tokyo, Japan

[21] Appl. No.: 09/349,225

[22] Filed: Jul. 8, 1999

[30] Foreign Application Priority Data

Jul. 10, 1998 [JP] Japan .................................. 10-196374

[51] Int. Cl.[7] ...................................................... G02F 1/00
[52] U.S. Cl. .............................. 359/237; 359/245; 385/2; 385/3; 385/8
[58] Field of Search ..................................... 359/237, 238, 359/239, 245, 246, 249; 385/1, 2, 3, 8

[56] References Cited

U.S. PATENT DOCUMENTS

| | | | |
|---|---|---|---|
| 4,968,110 | 11/1990 | Bulmer et al. | 359/246 |
| 5,917,179 | 6/1999 | Yao | 359/245 |

FOREIGN PATENT DOCUMENTS

| | | |
|---|---|---|
| 8-18139 | 1/1996 | Japan . |
| 11-121847 | 4/1999 | Japan . |

*Primary Examiner*—Loha Ben
*Attorney, Agent, or Firm*—Burns Doane Swecker & Mathis L.L.P.

[57] ABSTRACT

According to the present invention, damage to a photo-detector disposed in clock signal extractor by means of an optical pulse having an optical power exceeding a rated value is prevented. A ring resonator generates a repetitive, high-frequency optical pulse. Optical branching circuit branches a portion of the optical pulse circulating through ring resonator, while optical branching circuit further branches a portion thereof to protective device. Pumping source generates an excitation light for exciting a rare-earth doped optical fiber. Optical multiplexer couples the optical pulse branched by optical branching circuit, and the excitation light. Upon excitation by means of the excitation light, rare-earth doped optical fiber amplifies and emits the incoming optical pulse. The optical power of the excitation light is adjusted such that the output of rare-earth doped optical fiber reaches a saturation power. Optical switch blocks the incoming optical pulse during the time period when pumping source is not emitting an excitation light, and during a fixed time period following the emission of the excitation light. In this manner, the entry of an excessively large optical pulse exceeding the saturation power into photo-detector at the time of starting up the power source is prevented. Optical attenuator attenuates the optical power of the optical pulse emitted from optical switch to an optical power which the photo-detector is capable of photo-detecting. Photo-detector converts the optical pulse emitted from protective device into an electronic signal; narrow band filter extracts a clock signal from the output of photo-detector; and electric amplifier amplifies the output of narrow band filter, and outputs a clock signal. Phase shifter adjusts the phase of this clock signal; electric amplifier amplifies the output of phase shifter, and outputs a clock signal to optical modulator. Optical modulator modulates the intensity of the light circulating through the ring resonator based on the clock signal, and generates an optical pulse.

18 Claims, 3 Drawing Sheets

OPTICAL PULSE GENERATOR

BACKGROUND OF THE INVENTION

1. Field of the Invention

The present invention relates to a stabilized optical pulse generator for generating a repetitive, high-frequency optical pulse that is required in constructing an optical transmission system which operates at an extremely high speed. The present specification is based on a patent application filed in Japan (Japanese Patent Application No. Hei 10-196374), a portion of which is incorporated herein.

2. Relevant Art

Optical pulse generators which can be applied to the aforementioned type of optical transmission system have, for example, been disclosed in Japanese Patent Application, First Publication No. Hei 8-18139. FIG. 5 is a block diagram showing a structural example of the optical pulse generator according to this document. This optical pulse generator comprises a ring resonator R in which a rare-earth doped optical fiber 1, optical branching circuit 2, optical isolator 3, optical modulator 4, optical filter 5, and optical multiplexer 6 are sequentially connected with optical fibers. At this point, the description will concentrate on the problematic aspects of the related art, with details of each component shown in the aforementioned figure being described later.

The ring resonator R generates a repetitive, high-frequency optical pulse by circulating a laser light. The optical branching circuit 2 branches a portion of the optical pulse circulating through the ring resonator R, and optical branching circuit 8 further branches the optical pulse branched by the aforementioned optical branching circuit 2, and sends a portion of this optical pulse to a clock signal extractor 9. This clock signal extractor 9 extracts a clock signal from the incident optical pulse. A phase shifter 13 then adjusts the phase of the extracted clock signal, after which an electrical amplifier 14 amplifies the output of the phase shifter 13 and outputs the resultant clock signal CLK to the optical modulator 4. Based on the clock signal CLK, the optical modulator 4 then generates an optical pulse after modulating the intensity of the laser light circulating through ring resonator R.

At this point, the clock signal extractor 9 detects the optical pulse that is branched from optical branching circuit 8 by means of photo-detector 10. The photo current flowing into the photo-detector 10 increases in conjunction with an increasing optical power of the incident optical pulse to photo-detector 10. As a result, the optical power of the optical pulse, which is branched from the optical branching circuit 8 to clock signal extractor 9, damages the aforementioned photo-detector 10 when the optical power exceeds the photo-detection capability of this photo-detector 10. In other words, it is necessary to employ the photo-detector 10 under conditions wherein a rated value of the photo-detection current is not exceeded, since damage to the aforementioned photo-detector 10 results when a photo-detection current exceeding this rated value flows into the photo-detector 10. However, the above-described conventional technology does not limit the optical power of the optical pulse received by the photo-detector 10 to below a rated value. Accordingly, when the photo-detector 10 is damaged, the extraction of the clock signal by the clock signal extractor 9 is no longer possible. As a result, the optical modulator 4 is not able to modulate the intensity of the laser light circulating through the ring resonator R, such that the generation of an optical pulse no longer occurs.

SUMMARY OF THE INVENTION

It is an object of the present invention to prevent damage to the photo-detector 10, comprising a clock signal extractor 9 disposed in the interior of an optical pulse generator, from optical power which exceeds the rated value of the aforementioned.

According to the optical pulse generator of the present invention, a laser pulse oscillating means generates an optical pulse by means of harmonic mode locking using a clock possessing a predetermined modulation frequency. The clock of the aforementioned is obtained by means of photo-detecting the optical pulse emitted from the laser pulse oscillating means, and extracting a signal component of the aforementioned modulation frequency. A protective means then limits the optical power of the optical pulse emitted from the laser pulse oscillating means to an optical power which the clock extracting means is capable of photo-detecting, and emits the result to the clock extracting means. Consequently, according to the present invention, it is possible to prevent damage to the photo-detector and the like disposed in a clock extracting means from optical power which exceeds the rated value of the photo-detector.

BRIEF DESCRIPTION OF THE DRAWINGS

FIG. 4 is a graph showing the change in the optical power of a light emitted from a rare-earth doped optical fiber 23 accompanying the startup of the power source, as well as the timing at which the light switch is turned ON.

DETAILED DESCRIPTION OF THE PREFERRED EMBODIMENTS

Figure 1:
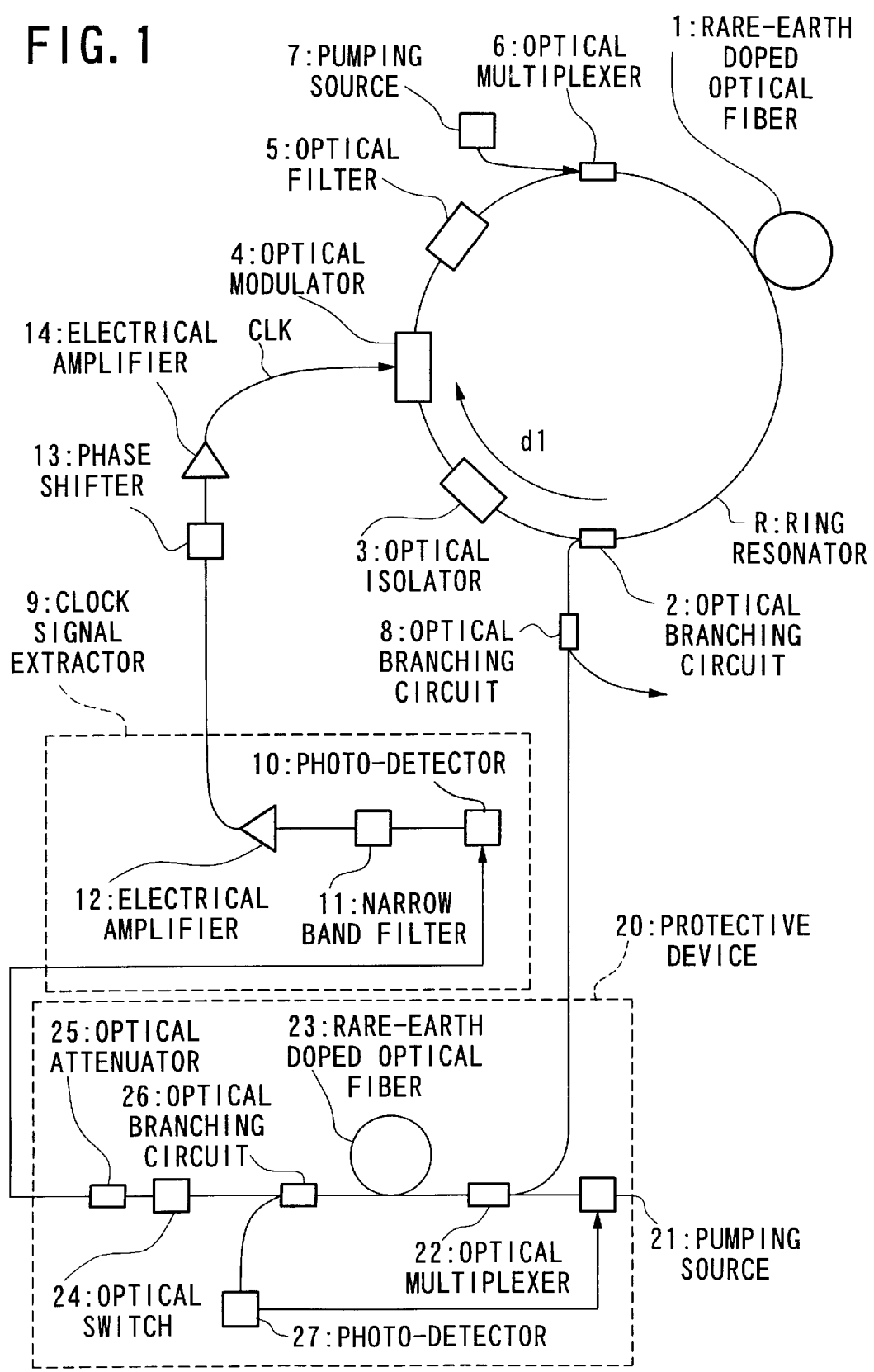
FIG. 1 is a block diagram showing the construction of an optical pulse generator according to an embodiment of the present invention.
Figure 5:
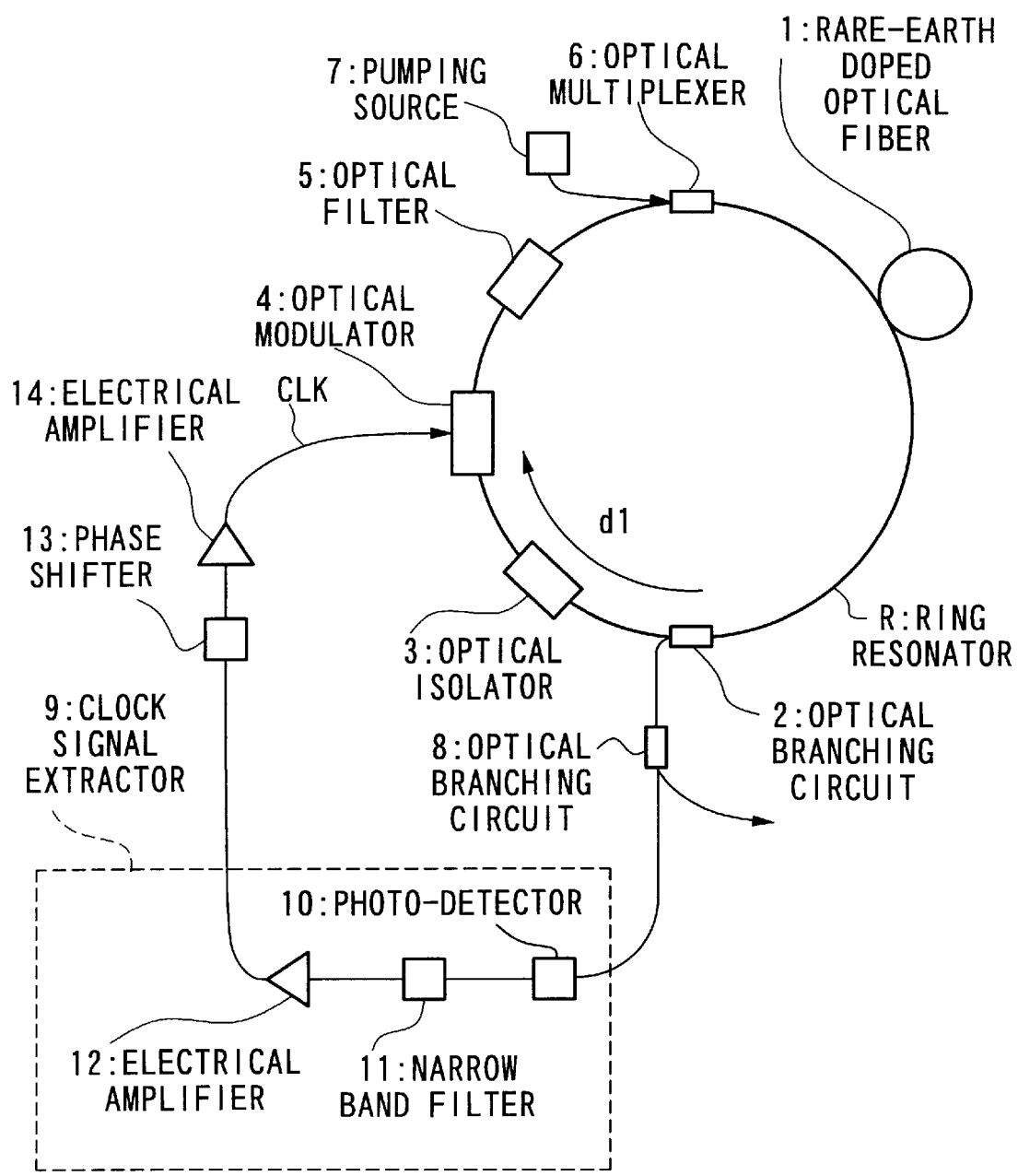
FIG. 5 is a block diagram showing the construction of a conventional optical pulse generator.

FIG. 1 is a block diagram showing the construction of an optical pulse generator according to an embodiment of the present invention. The structural components that are identical to those of the optical pulse generator shown in FIG. 5 are identified by the same numerals.

The rare-earth doped optical fiber 1 is an optical fiber which has been doped with a rare-earth element such as erbium or the like. This rare-earth doped optical fiber 1 is excited by means of an excitation light emitted from a light source (hereafter referred to as a "pumping source 7"), which is disposed on the exterior of the ring resonator R. Accordingly, the rare-earth doped optical fiber 1 conducts light amplification, such that a light having a preset wavelength, which is determined according to the rare-earth element used for doping, is radiated. An optical branching circuit 2 then extracts a portion of the optical pulse circulating through the ring resonator R to the exterior of the ring resonator R. Here, since the optical pulse to be extracted is simply an optical pulse possessing a phase that satisfies the resonance conditions of the ring resonator R, the outgoing optical pulse from optical branching circuit 2 becomes the laser light.

An optical isolator 3 determines the direction of circulation of the optical pulse in the ring resonator R. In other words, this optical isolator 3 circulates the optical pulse only in the d1 direction indicated in FIG. 1, and does not transmit an optical pulse propagating in the direction opposite that of the dl direction. Based on the clock signal CLK described hereinafter, optical modulator 4 generates an optical pulse after conducting intensity modulation with regard to the light circulating through the ring resonator R. In other words, the lights emitted from rare-earth doped optical fiber 1 repeatedly circulate through the ring resonator R; however, among these outgoing lights, there are also lights which have not circulated the equivalent of one cycle through the ring resonator R, and these lights are not yet transformed into an optical pulse. At this point, the optical modulator 4 modulates the intensity of the light which has not circulated one cycle, and converts it into an optical pulse.

Optical filter 5 possesses a predetermined passing band width, wherein lights possessing wavelengths which are not included in this passing band width are blocked out. In this manner, this optical filter 5 limits the wavelength of the optical pulse generated by means of the optical modulator 4 to a range within the amplification band of the rare-earth doped optical fiber 1. In addition, this optical filter 5 removes spontaneous emission light emitted from rare-earth doped optical fiber 1, and also removes light of nonessential wavelengths from among the light emitted from the pumping source 7. An optical multiplexer 6, which introduces the excitation light emitted from the pumping source 7 into the ring resonator R, is also provided. The aforementioned pumping source 7 generates the excitation light for exciting the rare-earth doped optical fiber 1.

Here, the fundamental frequency $f_0$ of the ring resonator R is determined according to the resonance length L in the following formula (1), wherein L represents the resonance length (i.e., the physical length of the loop constructing the ring resonator R), n represents the index of refraction of the optical fiber, and c represents the velocity of light.

$$f_0 = c/(nL) \quad (1).$$

A modulation frequency of q times (q is an integer) the fundamental frequency $f_0$ is then set for the optical modulator 4, as shown in the following formula (2). Accordingly, the clock signal CLK possessing this modulation frequency is supplied to the optical modulator 4. As a result, the modulation frequency and repeat frequency of the optical pulse conform with one another, and a harmonic mode locking is achieved, such that a repetitive, high-frequency optical pulse series can be generated in a stable manner, over a long period of time.

$$qf_0 = qc/(nL) \quad (2).$$

On the other hand, optical branching circuit 8 is connected to optical branching circuit 2, such that an optical pulse emitted from the ring resonator R via optical branching circuit 2 is further branched into two directions. Among the branched optical pulses, one optical pulse is supplied, for example, to the aforementioned optical transmission system, while the other optical pulse enters the clock signal extractor 9 via a protective device 20 (to be described in detail hereinafter). The clock signal extractor 9 is constructed from a photo-detector 10 for converting an incident optical pulse into an electronic signal; narrow band filter 11 for extracting the clock signal possessing a frequency of q times (wherein q represents an integer) the fundamental frequency of the ring resonator R from the output of photo-detector 10; and electrical amplifier 12 for amplifying the output of this narrow band filter 11. According to this construction, the clock signal extractor 9 extracts the clock signal which has been converted into an electronic signal from the incident optical pulse.

The photo-detector 10 is a component which converts the optical power of the incident optical pulse into a photo-electric current. The photo-electric current can be expressed by means of the following formula (3), wherein P is the optical power of the optical pulse entering the photo-detector 10, I is the photo-electric current flowing into the photo-detector 10, and S is the photosensitivity of the photo-detector 10. For example, a photo-electric current I of 8 mA results when an optical pulse having an optical power of 10 mW enters a photo-detector 10 having a photosensitivity of 0.8 A/w:

$$I = SP \quad (3)$$

As seen from the formula, the photo-electric current flowing to the photo-detector 10 increases as the optical power of the optical pulse entering the photo-detector 10 rises.

On the other hand, phase shifter 13 adjusts the phase of the clock signal that is outputted from the clock signal extractor 9. In addition, an electrical amplifier 14 amplifies the clock signal that is outputted from the aforementioned phase shifter 13, and inputs the amplified clock signal into the optical modulator 4 as clock signal CLK.

The most characteristic aspect of the optical pulse generator according to the present embodiment lies in the installation of a protective device 20 in between the optical branching circuit 8 and clock signal extractor 9. This protective device 20 comprises a pumping source 21, optical multiplexer 22, rare-earth doped optical fiber 23, optical switch 24, optical attenuator 25, optical branching circuit 26, and photo-detector 27. The pumping source 21 generates an excitation light for exciting the rare-earth doped optical fiber 23. In addition, the optical multiplexer 22 couples the optical pulse branched from optical branching circuit 8 with the excitation light generated by the aforementioned pumping source 21, and emits the result to the rare-earth doped optical fiber 23. The rare-earth doped optical fiber 23 possesses the same function as the above-described rare-earth doped optical fiber 1: hence, after undergoing excitation from the excitation light generated by the pumping source 21, rare-earth doped optical fiber 23 amplifies and emits the optical pulse branched from optical branching circuit 8 to optical branching circuit 26.

Figure 2:
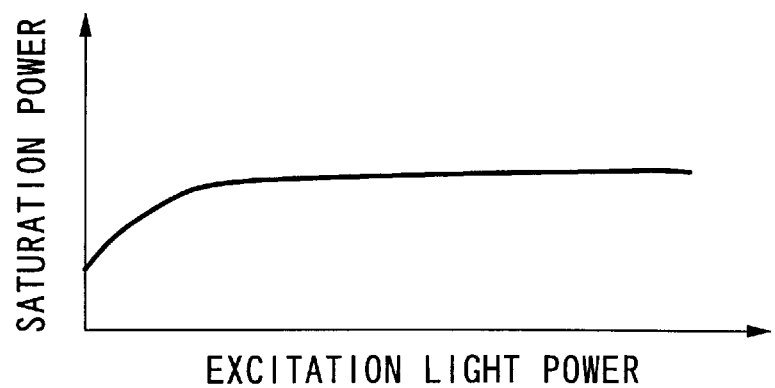
FIG. 2 is a graph showing the relationship between the excitation light power and output power with regard to a rare-earth doped optical fiber.

Here, the optical power range over which the rare-earth doped optical fiber 23 is capable of conducting emission is determined according to the excitation light power of the excitation light emitted from the pumping source 21. FIG. 2 is a graph showing the general relationship between the excitation light power (horizontal axis) imparted to a rare-earth doped optical fiber, and output power (vertical axis) of the light emitted from the rare-earth doped optical fiber. The rare-earth doped optical fiber cannot amplify the incident light above an optical power exceeding the saturation power which is determined from its intrinsic properties.

Figure 3:
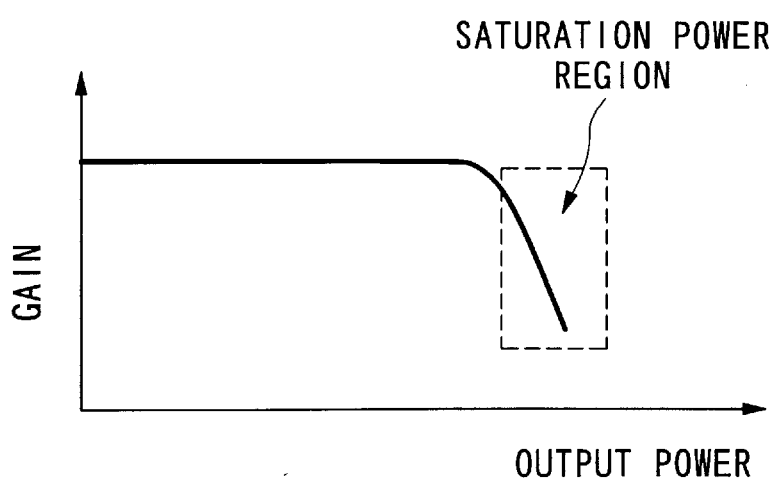
FIG. 3 is a graph showing the relationship between the output power and gain with regard to a rare-earth doped optical fiber.

Incidentally, in the case when conducting optical amplification using a rare-earth doped optical fiber, normally the excitation light power of the excitation light is adjusted such that the rare-earth doped optical fiber does not reach the saturation power due to the optical power of the incoming optical pulse. The reason for the aforementioned is because it is desirable to fix the gain at the time of amplifying the incident light by means of the rare-earth doped optical fiber. FIG. 3 is a graph showing the general relationship between the output power (horizontal axis) of the light emitted from a rare-earth doped optical fiber, and the gain (vertical axis) at the time when the rare-earth doped optical fiber conducts amplification. An amplification gain due to the rare-earth doped optical fiber becomes constant value except for the range around the saturation power (referred to as "saturation power region" in the figures) which is determined by the characteristic of the rare-earth doped optical fiber. Consequently, since the output power of the rare-earth doped optical fiber does not enter into the saturation power region, it is possible to fix the amplification gain.

With regard to the aforementioned, according to the present embodiment, the excitation light power of the excitation light is adjusted such that the output power of the rare-earth doped optical fiber 23 reaches the saturation power due to the optical power of the incoming optical pulse. Here, the aforementioned clock signal extractor 9 needs only to convert the optical pulse emitted from the optical branching circuit 8 (via protective device 20) into an electronic signal, and extract the clock signal. In other words, it is not necessary for the amplification gain of the rare-earth doped optical fiber 23 to be fixed with respect to the incoming optical pulse, as there are no problems incurred even if the output power of the rare-earth doped optical fiber 23 reaches the saturation power. On the other hand, the saturation power of the rare-earth doped optical fiber 23 also represents the maximum optical power that the rare-earth doped optical fiber 23 is capable of emitting. Consequently, with the exception of the following case, even when the output of the rare-earth doped optical fiber 23 enters the photo-detector 10, it is possible to ensure that optical power which exceeds the aforementioned saturation power does not enter into photo-detector 10. In other words, the rare-earth doped optical fiber 23 functions as an optical limiter.

An optical branching circuit 26 then branches the optical pulse emitted from rare-earth doped optical fiber 23, and respectively emits the branched optical pulses to optical switch 24 and photo-detector 27. Photo-detector 27 converts the optical power of the optical pulse branched by optical branching circuit 26 into an electronic signal, and based on this converted electronic signal, by means of controlling the excitation light power of the excitation light generated by the pumping source 21, the output of rare-earth doped optical fiber 23 becomes a fixed saturation power as shown in FIG. 2.

The aforementioned optical switch 24 either blocks or allows the passage of the incoming optical pulse. Furthermore, in the following, the phrase "optical switch 24 is OFF" refers to the time when the optical switch 24 resides in the blocking state, while the phrase "optical switch 24 is ON" refers to the time when the optical switch 24 allows the passage of the optical pulse. In the following, the reasons for disposing the aforementioned optical switch 24 will be explained.

Figure 4:
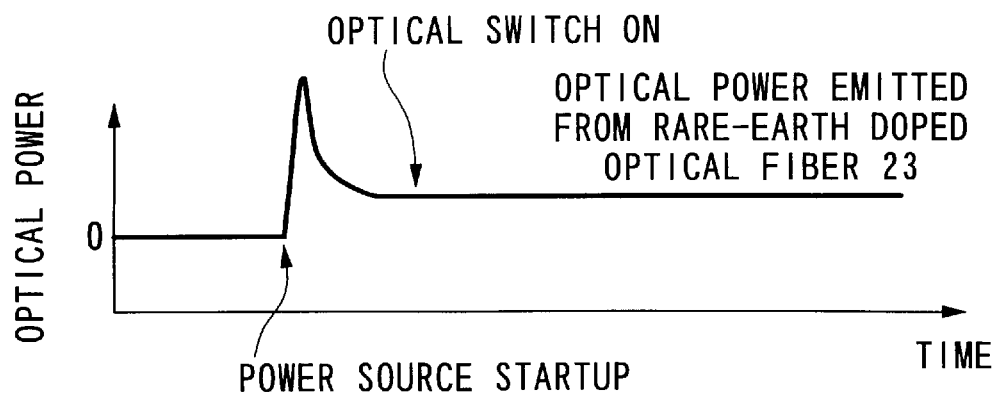

As described above, according to the present embodiment, the optical power of the optical pulse emitted from rare-earth doped optical fiber 23 is designed to achieve a fixed value, however, exceptions to this condition also occur as described below. As shown in FIG. 4, at the startup time point of the power source, since an optical pulse is not emitted from rare-earth doped optical fiber 23, the optical power is "0"; however, accompanying the startup of the power source, an excitation light having a high optical power enters rare-earth doped optical fiber 23. Here, when an excitation light having a high optical power suddenly enters rare-earth doped optical fiber 23 which lies in an unexcited state, this rare-earth doped optical fiber 23 emits an excessive optical pulse which exceeds the saturation power thereof. At this time, as long as optical switch 24 is OFF, it is possible to protect the photo-detector 10, as light having an optical power exceeding the rated value of photo-detector 10 is not allowed to enter therein. However, if by chance the optical switch 24 is in the ON position, damage to the photo-detector 10 will occur from light having an optical power exceeding the aforementioned rated value. Hence, in consideration of the aforementioned, in the present embodiment, the optical switch 24 remains OFF during the period in which an excitation light is not emitted to rare-earth doped optical fiber 23, and is turned ON for the first time only after the passage of a fixed period of time following the initial emission of the excitation light. In this manner, it is possible to protect the photo-detector 10 from an excessive optical pulse emitted from rare-earth dosped optical fiber 23.

Subsequently, with regard to the optical pulse emitted from rare-earth doped optical fiber 23 via optical branching circuit 26 and optical switch 24, optical attenuator 25 attenuates the optical power of the aforementioned optical pulse to an optical power which the photo-detector 10 is capable of photo-detecting, and sends this attenuated optical pulse to photo-detector 10. In other words, the optical power of the optical pulse entering photo-detector 10 is an attenuated value of the maximum optical power (saturation power) that the rare-earth doped optical fiber 23 is capable of emitting, which has been attenuated by means of optical attenuator 25. For example, if the excitation light power of the excitation light emitted from pumping source 21 is 50 mW, the maximum optical power that the rare-earth doped optical fiber 23 is capable of emitting is 10 mW, and the maximum optical power that photo-detector 10 is capable of detecting is 1 mW, then in this case, regardless of the magnitude of the excitation light power, the maximum optical power for an optical pulse emitted from rare-earth doped optical fiber 23 is 10 mW. Consequently, as long as the optical attenuator 25 attenuates this optical power by $\frac{1}{10}$, it is possible to keep the optical power of the optical pulse entering photo-detector 10 to below 1 mW, and thereby avoid damage to this photo-detector 10.

In the following, an operation of the optical pulse generator comprising the aforementioned construction will be described. Initially, the optical pulse generator generates a repetitive, high-frequency optical pulse as outline below. In other words, when pumping source 7 emits an excitation light, this excitation light enters the ring resonator R via an optical multiplexer 6. This incident excitation light then propagates through the inner portion of rare-earth doped optical fiber 1, and accordingly excites this rare-earth doped optical fiber 1. As a result, the excited rare-earth doped optical fiber 1 emits light having a predetermined wavelength. This emission light then propagates in the d1 direction within the interior of the ring resonator R. In other words, this emission light enters optical modulator 4 by passing sequentially through optical branching circuit 2 and optical isolator 3; and this light undergoes intensity modulation in optical modulator 4 before being converted into an optical pulse.

This optical pulse then further propagates in the d1 direction within the interior of the ring resonator R, and enters rare-earth doped optical fiber 1 by passing sequentially through optical filter 5 and optical multiplexer 6. At this time, since the excitation light emitted from pumping source 7 enters into rare-earth doped optical fiber 1, this rare-earth doped optical fiber 1 amplifies and emits an optical pulse which has traveled one cycle in the ring resonator R. This amplified light then propagates further in the d1 direction through the interior of the ring resonator R, and after passing through optical branching circuit 2 and optical isolator 3 reaches optical modulator 4, where it is transformed into an optical pulse. Thereafter, the optical pulse propagates through the interior of the ring resonator R in the same manner as described above.

On the other hand, optical branching circuit 2 branches a portion of the optical pulse circulating through the ring resonator R, and emits this optical pulse to the exterior of the ring resonator R. Optical branching circuit 8 further branches the optical pulse branched by means of optical branching circuit 2 into two directions: one optical pulse is supplied to the aforementioned optical transmission system, while the other optical pulse is sent to protective device 20.

In the following, the operation which occurs at the time when the optical pulse emitted from optical branching circuit 8 enters protective device 20 will be explained. To begin with, the case in which an excitation light is either not emitted from pumping source 21, or in which the aforementioned fixed time period from the initial emission of the excitation light has not elapsed will be described. In this case, since optical switch 24 is OFF, even if the optical pulse emitted from rare-earth doped optical fiber 23 passes through optical branching circuit 26 and reaches optical switch 24, this optical pulse will be blocked by optical switch 24, and hence, will not be allowed to enter photo-detector 10. As a result, even if an excessively large optical pulse which exceeds the saturation power is emitted from rare-earth doped optical fiber 23, at the startup time point of the power source, there is no fear of damaging the photo-detector 10.

On the other hand, the operation after the elapse of the aforementioned fixed time period from the initial emission of the excitation light will be described in the following. In other words, the optical pulse emitted from optical branching circuit 8 enters rare-earth doped optical fiber 23 via an optical multiplexer 22 within protective device 20. At this time, since rare-earth doped optical fiber 23 is excited by means of the excitation light emitted from pumping source 21, this rare-earth doped optical fiber 23 amplifies the optical power of the incoming optical pulse, and emits it therefrom. This amplified optical pulse enters optical branching circuit 26 where it is branched into two directions: one optical pulse enters optical switch 24, while the other optical pulse enters photo-detector 27. Photo-detector 27 transmits a control signal with respect to pumping source 21 in order to fix the optical power of the optical pulse emitted from rare-earth doped optical fiber 23. In addition, since optical switch 24 resides in the ON state from the time point after the elapse of the aforementioned fixed time period following the initial emission of the excitation light, the optical pulse entering from optical branching circuit 26 is allowed to pass unhindered, and is subsequently emitted to optical attenuator 25. Optical attenuator 25 then, after attenuating the optical power of the incident optical pulse to a level which photo-detector 10 is capable of photo-detecting, emits the optical pulse to photo-detector 10.

In this manner, clock signal extractor 9 converts the incident optical pulse into an electronic signal and extracts a clock signal therefrom. A phase shifter 13 then adjust the phase of the clock signal extracted by clock signal extractor 9. Electrical amplifier 14 subsequently amplifies the output of the phase shifter 13, and outputs the result to optical modulator 4 as a clock signal CLK. Based on this clock signal CLK, optical modulator 4 modulates the intensity of the laser light circulating through the ring resonator R, and emits an optical pulse as described above.

As described in the aforementioned, the utilization of the saturation power of the rare-earth doped optical fiber 23 represents the greatest characteristic of the present embodiment. And, by means of disposing a protective device 20 between optical branching circuit 8 and clock signal extractor 9, it is possible to protect photo-detector 10 even in the case when the optical power of the optical pulse emitted from optical branching circuit 8 is larger than the maximum optical power which the photo-detector 10 in clock signal extractor 9 is capable of photo-detecting.

In addition, according to the present embodiment, since the optical power of the optical pulse emitted from rare-earth doped optical fiber 23 is designed to reach the saturation power thereof, when excluding the startup of the power source, entry of an optical pulse with an optical power exceeding the saturation power from rare-earth doped optical fiber 23 does not occur. As a result, it is possible to protect the photo-detector 10 regardless of the excitation light power emitted from the pumping source 21, as long as the rated value of the photo-detector 10 is set to above the saturation power.

In addition, according to the present embodiment, the optical power of the optical pulse emitted from rare-earth doped optical fiber 23 is attenuated to an optical power which the photo-detector 10 is capable of photo-detecting, and then emitted to photo-detector 10. Therefore, even in the case when the saturation power of the rare-earth doped optical fiber 23 exceeds the rated value of the photo-detector 10, it is possible to keep the optical power of the incoming optical pulse to a value below the aforementioned rated value of photo-detector 10, and thereby protect the photo-detector 10.

Furthermore, according to the present embodiment, the optical pulse emitted from rare-earth doped optical fiber 23 via optical branching circuit 26 is blocked by means of optical switch 24, during times when there is no emission of an excitation light, as well as during the fixed time period (i.e., until the elapse of the fixed time period) following the initial emission of the excitation light. As a result, it possible to protect the photo-detector 10 even when an excessive optical pulse exceeding the saturation power is generated from the entry of an excitation light, having a high optical power into rare-earth doped optical fiber 23, at the startup time of the power source.

Furthermore, in the aforementioned embodiment, it is also possible to consider cases in which the saturation power value of the rare-earth doped optical fiber 23 does not exceed the optical power which the photo-detector 10 is capable of photo-detecting. In such cases, it is not always necessary to dispose an optical attenuator 25.

What is claimed is:

1. An optical pulse generator comprising:
    a laser pulse oscillating means for generating an optical pulse by means of harmonic mode locking using a clock possessing a predetermined modulation frequency;
    a clock extracting means for detecting said optical pulse which is emitted from said laser pulse oscillating means, extracting a signal component of said modulation frequency, and supplying the extracted signal to said laser pulse oscillating means as said clock; and
    protective means for limiting the optical power of said optical pulse to an optical power which said clock extracting means is capable of photo-detecting, and emitting the result to said clock extracting means.

2. An optical pulse generator according to claim 1, wherein said protective means comprises
    optical amplifying means for amplifying said optical pulse emitted from said laser pulse oscillating means to within a predetermined fixed saturation optical power, and emitting the result to said clock extracting means; and excitation means for generating an excitation light possessing an optical power which saturates an output of said optical amplifying means, and exciting said optical amplifying means by emitting said excitation light to said optical amplifying means.

3. An optical pulse generator according to claim 2, wherein the level of said saturation optical power is no greater than the optical power level which said clock extracting means is capable of photo-detecting.

4. An optical pulse generator according to claim 3, wherein said protective means further comprises an optical switch means for blocking an optical pulse emitted from said optical amplifying means during the time period when said excitation means is not emitting said excitation light, and during a fixed time period following the emission of said excitation light.

5. An optical pulse generator according to claim 4, wherein said excitation means comprises a pumping source for generating and emitting said excitation light to said optical amplifying means; and a photo-detecting means for detecting an optical pulse emitted from said optical amplifying means, and adjusting the optical power of said excitation light generated by said pumping source based on the optical power of said optical pulse.

6. An optical pulse generator according to claim 3, wherein said excitation means comprises a pumping source for generating and emitting said excitation light to said optical amplifying means; and a photo-detecting means for detecting an optical pulse emitted from said optical amplifying means, and adjusting the optical power of said excitation light generated by said pumping source based on the optical power of said optical pulse.

7. An optical pulse generator according to claim 3, wherein said optical amplifying means is a rare-earth doped optical fiber.

8. An optical pulse generator according to claim 2, wherein said protective means further comprises an optical attenuating means for attenuating the optical power of an optical pulse emitted from said optical amplifying means to a level no greater than the optical power level which said clock extracting means is capable of photo-detecting, and emitting the result to said clock extracting means.

9. An optical pulse generator according to claim 8, wherein said protective means further comprises an optical switch means for blocking an optical pulse emitted from said optical amplifying means during the time period when said excitation means is not emitting said excitation light, and during a fixed time period following the emission of said excitation light.

10. An optical pulse generator according to claim 9, wherein said excitation means comprises a pumping source for generating and emitting said excitation light to said optical amplifying means; and a photo-detecting means for detecting an optical pulse emitted from said optical amplifying means, and adjusting the optical power of said excitation light generated by said pumping source based on the optical power of said optical pulse.

11. An optical pulse generator according to claim 8, wherein said excitation means comprises a pumping source for generating and emitting said excitation light to said optical amplifying means; and a photo-detecting means for detecting an optical pulse emitted from said optical amplifying means, and adjusting the optical power of said excitation light generated by said pumping source based on the optical power of said optical pulse.

12. An optical pulse generator according to claim 8, wherein said optical amplifying means is a rare-earth doped optical fiber.

13. An optical pulse generator according to claim 2, wherein said protective means further comprises an optical switch means for blocking an optical pulse emitted from said optical amplifying means during the time period when said excitation means is not emitting said excitation light, and during a fixed time period following the emission of said excitation light.

14. An optical pulse generator according to claim 13, wherein said excitation means comprises a pumping source for generating and emitting said excitation light to said optical amplifying means; and a photo-detecting means for detecting an optical pulse emitted from said optical amplifying means, and adjusting the optical power of said excitation light generated by said pumping source based on the optical power of said optical pulse.

15. An optical pulse generator according to claim 13, wherein said optical amplifying means is a rare-earth doped optical fiber.

16. An optical pulse generator according to claim 2, wherein said excitation means comprises a pumping source for generating and emitting said excitation light to said optical amplifying means; and a photo-detecting means for detecting an optical pulse emitted from said optical amplifying means, and adjusting the optical power of said excitation light generated by said pumping source based on the optical power of said optical pulse.

17. An optical pulse generator according to claim 16, wherein said optical amplifying means is a rare-earth doped optical fiber.

18. An optical pulse generator according to claim 2, wherein said optical amplifying means is a rare-earth doped optical fiber.

* * * * *